United States Patent Office 3,441,515
Patented Apr. 29, 1969

3,441,515
METHOD FOR MANUFACTURING IMPROVED PERLITE FILTERAID PRODUCTS
Otto A. Oshida, John P. Gilmore, and James H. Lowe, Albuquerque, N. Mex., assignors to Grefco, Inc., Philadelphia, Pa., a corporation of Delaware
No Drawing. Filed Feb. 13, 1967, Ser. No. 615,396
Int. Cl. B01d 39/02; B01j 11/32
U.S. Cl. 252—455                                   6 Claims

ABSTRACT OF THE DISCLOSURE

The filtration characteristics, particularly regarding improved flow rate, of perlite filteraids are substantially improved by treating these materials uniformly with a solution of an alkali metal (M) silicate having an $SiO_2/M_2O$ weight ratio greater than 1.5:1, in an amount between 0.5 to 5% by weight of the perlite filteraid. Preferably, sodium silicate is used with a ratio of $SiO_2/Na_2O$ between about 2 to 4:1. A sufficient amount of water or other solvent is used to dissolve the alkali metal silicate product and then a controlled amount of the solution is mixed with the perlite filteraid product in order to uniformly wet and treat the filteraid particles. The resulting treated product is then heated to a temperature sufficiently high to remove substantially all of the solvent but below the fusion point of the treated filteraid product. Where water is used as a solvent, the heat-treatment will be within a range of 220° to about 1000° F. and preferably within a range of 500 to 1000° F.

BACKGROUND OF THE INVENTION

Field of the invention

The invention pertains to filteraids prepared from perlite and is particularly directed to the improvement of the flow rate characteristics by economical means. In preparing perlite filteraids, it is desirable to produce a wide range of products having flow rate properties from slow to fast, depending upon the type of liquid to be filtered. The process of this invention has increased the range of perlite filteraid products which can be made available commercially to provide high flow rate properties which will filter a larger variety of liquids.

Description of the prior art

Fliteraids are prepared commercially from expanded perlite, which in turn is prepared by expanding perlite, a volcanic glass consisting essentially of aluminum silicate with combined water content of 2 to 5%, in a furnace under controlled temperatures within the range of 1600 to 2000° F. Methods for expanding perlite to a suitable bulk density, for example 2 to 6 pounds per cubic foot, are disclosed in U.S. Letters Patent Nos. 2,501,962 and 2,621,160. One variety of perlite filteraids is disclosed in U.S. 2,665,813, this being a rather coarse graded material with a high percentage of particles which float in water, but these products are not generally suitable for filtering liquids containing very fine, suspended particles. For filtration of the latter, perlite filteraids are prepared in accordance with the teachings in British Patent 791,993 published Mar. 19, 1958. According to this process, expanded perlite having an apparent bulk density of from about 1 to 6 pounds per cubic foot, is milled until the product is substantially free from particles which will float in water, and is then air classified in devices well known to the art to produce a range of filteraid products characterized by having high, medium and low flow rates useful for filtration of industrial liquids, such as raw sugar solutions. Where it is desired to produce a high flow rate product by the process disclosed in the aforementioned British patent, one must minimize the amount of particles having an average particle diameter of less than 4 microns, and increase the 10 to 40 micron fraction. This can only usually be done by eliminating the minus 6, or even the minus 10 micron fractions, to the greatest extent possible, thereby resulting in a substantial loss of product unless other uses can be found for the rejected fines.

A process for upgrading expanded perlite filteraid products has been disclosed in U.S. 3,235,635 dated Feb. 15, 1966. According to this procedure, a fine divided perlite filteraid product is mixed with a liquid, with or without a fluxing agent, in order to coalesce the particles, and the wetted product is then calcined to effect a sintering of the perlite particles during calcination thereby increasing the flow rate properties of the product. However, it is apparent that the latter process requires a sufficiently high calcination temperature in order to sinter the particles, thereby affecting their surface characteristics and detracting from the clarifying power of the products.

SUMMARY OF THE INVENTION

In accordance with the process of this invention, perlite filteraids of the prior art, prepared as previously disclosed, are upgraded, particularly with respect to flow ratio characteristics, without the necessity for calcining the products to such a high temperature that the particles will be sintered. By the term "perlite filteraids" is meant a range of products prepared in accordance with the methods disclosed in U.S. 2,665,813 and British 791,993, previously referred to herein. As will be disclosed in more detail subsequently herein, the process of this invention can be utilized by treating a series of low, medium and high flow rate products as these terms are defined in the British Patent 791,993. The filteraid particles are treated with a solution of an alkali metal (M) silicate having an $SiO_2/M_2O$ weight ratio greater than 1.5:1, and preferably within the range of about 2 to 4:1. A particularly useful type of alkali metal silicate solution is the product made by the Philadelphia Quartz Company and marketed under the brand name "N" wherein the ratio of $SiO_2/Na_2O$ is 3.2 to 1. As will appear subsequently in Table III, a range of sodium silicate solutions having various trade names, and wherein the $SiO_2/Na_2O$ ratio is from 2.0 to 3.75:1, has been found to be particularly useful in treating a variety of perlite filteraid products to produce coated perlite filteraids which are then subsequently heated under conditions to be described herein. It has been found that sodium metasilicate, $Na_2SiO_3 \cdot 5H_2O$, in which the ratio of $SiO_2/Na_2O$ is 1:1, and other alkali metal metasilicates, are not suitable for the process of this invention and substituting these types of silicates for those disclosed and claimed herein, have litle effect if any upon the perlite filteraid particles.

Depending upon the type of silicate solution selected, a sufficient amount of water is added so that the resulting solution will uniformly wet the perlite filteraid particles so as to distribute the silicate solution uniformly throughout the mass of particles prior to heat-treatment. Usually, it has been found that equal parts by weight of the perlite filteraid and the silicate solution will perform satisfactorily. The particles and the treating solution are thoroughly blended in a variety of devices which can include paddle mixers, rotary mixers, or vessels in which the perlite filteraid particles are fluidized or otherwise air-conveyed and the solution is injected into the fluidized bed or stream of particles. After the particles have been thoroughly and uniformly treated with the solution, they are then dried to remove substantially all of the solvent. It is essential that the heating temperature be below the incipient fusion temperature of the treated product to prevent fusion or sintering of the product. This heat-treatment reduces the solubility of the product in aqueous systems in case the product is to be used where water is the major solvent. Where slight water-solubility of the product is not objectionable, the product can be heated at approximately 220° F. However, where minimum solubility of the product in the solution to be filtered is desired, the heat-treatment should be accomplished at temperatures in the range of 500 to 1000° F. The flow rate properties of the thus treated perlite filteraid product have been found to be considerably improved, in many cases of the order of 100 to 300% as compared to the untreated product.

For the sake of economy, the solvent employed for sodium silicate is usually water, but other solvents, such as organic solvents (i.e. alcohols, ketones, and other water-miscible solvents, etc.) in which the sodium silicate products are soluble, may be used.

As previously stated, the perlite filteraid products treated with the sodium silicate solution must be heated in order to minimize the solubility of the filteraid product in the liquor to be filtered. It is essential that the heating temperature not be so high as to cause fusion or sintering of the product which would alter its surface characteristics and affect its filtration properties, particularly regarding clarity. The heated product appears to be conditioned on its surface by the sodium silicate treatment and forms very weak agglomerates of the filteraid particles which can easily be broken down or separated but which retain an inherent characteristic shape and size. The improved flow rate properties which are observed for the final products are not due to any fluxing action which characterizes flux-calcined products of the prior art, but are apparently due to an electrokinetic phenomenon on the original filteraid particles caused by the coating of the sodium silicate which has an effect on the electrical charge on the impurity particles suspended in the liquid to be filtered. Therefore, it is not necessary to mill the heated product, but rather only to agitate it gently to break up the weak agglomerates which are originally formed.

DESCRIPTION OF THE PREFERRED EMBODIMENTS

In the following examples, a series of perlite filteraids having a variety of flow rates were prepared in accordance with the procedure disclosed in British Patent 791,993. A given weight of the perlite product was then placed in a suitable vessel, and an equal weight of sodium silicate solution, having an SiO$_2$/Na$_2$O ratio as indicated in Tables I and III, was added to the perlite filteraid particles and this mixture was then stirred for about 15 minutes in order to uniformly wet the particles. The products were then heated to a temperature of 220° F. after which they were lightly brushed through a 50 mesh screen, to break up the weak agglomerates. The permeability flow ratio (PFR) of the finished product was used as an evaluation index of the improvement in the flow rate properties of the treated products as compared to the control (untreated) products. The PFR values are determined by measuring the time required for a given quantity of water to filter through a given weight of filteraid product. The volume of filtrate obtained is then compared with the volume of water filtered through the same weight of a standard perlite filteraid (Type 476 as manufactured by the Dicalite Division of Grefco, Inc.), this standard product being assigned a flow rate value of 100. In this procedure, a given weight of the filteraid is placed in a beaker and a sufficient amount of distilled water is added. The filteraid is dispersed in the water and poured into a "permeability tube." This is a graduated tube having a piece of wet duck filter cloth stretched across one end which is placed on a bored stopper inserted in a filter flask so that the permeability tube is aligned vertically. While maintaining a constant vacuum on the filter flask by means of a vacuum regulator, the slurry of filteraid is poured gradually into the permeability tube. When the filter cake is nearly completely formed, an additional amount of distilled water is added to fill the tube. The time for the flow of 8 ml. is recorded. The cake volume is read to the nearest one-tenth ml. and a record is made of the vacuum, temperature, time and cake volume. The PFR (percent) is calculated as follows:

$$\text{PFR (percent)} = 100\sqrt{\frac{K_1 \text{ sample}}{K_2 \text{ Std.}}}$$

$K_1 = V/O$
$K_2 =$ permeability constant
$O =$ time of flow for 8 ml. in seconds at constant vacuum and temperature
$V =$ cake volume in ml.

Since PFR is a filtration flow ratio, it is a function of the square root of the permeability ratio.

It has been found that the PFR data accurately predict the performance of the filteraid in a variety of industrial liquids to be filtered by the product.

In the following examples, five standard perlite filteraids (Controls A–E), manufactured in accordance with the procedures specified in British 791,993, were treated with an equal weight of solution of "N" brand sodium silicate (Philadelphia Quartz Company) having a SiO$_2$/Na$_2$O ratio of 3.2:1, in the amounts indicated. After thorough mixing of the solution with the perlite filtered sample, the products were heated to a temperature of 220° F. until they were at a constant weight, and then brushed through a 50-mesh screen to break up the weak agglomerates. The water permeability flow ratios were then determined, and also the water solubilities values of the products were obtained. The data appear in Table I below. The PFR data for the various control samples are compared to the Standard Type 476 perlite filteraid previously mentioned herein, and which has the following particle size distribution:

Particle size (microns)—Vol. percent

| | |
|---|---|
| 0–2 | 5.0 |
| 2–6 | 23.5 |
| 6–10 | 32 |
| 10–20 | 25.0 |
| 20–30 | 8.0 |
| +30 | 6.0 |

The above product was assigned a permeability flow ratio (PFR) value of 100 and is designated as Control A in Table I below. Additional samples of commercial perlite filteraids, designated as Controls B through E were selected and treated with N brand sodium silicate in the amounts indicated in Table I. The control products having PFR values less than 100 indicate that these products contain a higher percentage of the very fine filteraid particles, particularly the 0 to 6 micron fraction, than the Control A sample; and the control samples having PFR values higher than 100 indicate that a smaller amount of the 0–6 micron fraction is present in these samples, and a higher percentage of the +20 micron fractions.

After the products were treated with the solution of sodium silicate by the procedure described above, the water solubility figures for the products were also determined.

TABLE I

| Ex. No. | Product | Treatment (wt. percent) | PFR | H₂O solubility (wt. percent) |
|---|---|---|---|---|
| 1 | Control A [1] | None | 100 | 0.9 |
| 2 | do | 2.5 | 210 | 1.7 |
| 3 | Control B | None | 30 | 0.7 |
| 4 | do | 2.5 | 56 | 1.7 |
| 5 | do | 5.0 | 68 | 2.6 |
| 6 | do | 10.0 | 63 | 5.1 |
| 7 | Control C | None | 42 | 0.6 |
| 8 | do | 2.5 | 74 | 1.8 |
| 9 | do | 5.0 | 89 | 2.4 |
| 10 | do | 10.0 | 118 | 5.1 |
| 11 | Control D | None | 70 | 0.5 |
| 12 | do | 0.5 | 123 | |
| 13 | do | 1.0 | 156 | |
| 14 | do | 2.5 | 149 | 1.6 |
| 15 | do | 5.0 | 156 | 2.1 |
| 16 | do | 10.0 | 209 | 6.5 |
| 17 | Control E | None | 118 | 0.7 |
| 18 | do | 2.5 | 190 | 1.9 |
| 19 | do | 5.0 | 246 | 2.4 |
| 20 | do | 10.0 | 236 | 4.1 |

[1] Standard Filter Aid 476.

The above data indicate that the permeability flow ratio characteristics of the commercial grade perlite filteraid products can be improved substantially, often in excess of 100%. The data also show that if the products are treated with more tahn 5% by weight of sodium silicate, the water solubility properties of the finished products become so high as to make the product unacceptable for the large majority of commercial filtration applications. The solubility of the filteraid product should not exceed about 2½%.

The following examples show the effect of heating the filteraid products prepared according to this invention at various temperatures. In Examples 21–23, a sample of the Control A perlite filteraid was treated with 2.5% by weight of sodium silicate in the manner previously described herein, this being the type N sodium silicate. The treated products were heated at the temperature indicated in Table II, and the PFR and water solubility figures were obtained.

TABLE II

| Ex. No. | Temp., °F. | PFR | H₂O solubility (wt. percent) |
|---|---|---|---|
| 21 | 220 | 205 | 2.5 |
| 22 | 482 | 242 | 1.8 |
| 23 | 932 | 244 | 0.7 |

The following examples, which appear in Table III, show the necessity for maintaining the proper ratio of SiO₂/Na₂O in accordance with the process of the present invention. Various commercial types of sodium silicate (designated in column 2 of Table III), as manufactured by the Philadelphia Quartz Company, were used, in the amounts indicated in column 4 of Table III, and the PFR values were obtained. In this series, the commercial perlite filteraid designated as Control D and B in Table I were employed, the procedure for treating these products with the sodium silicate solution being the same as was the case for preparing the products of Examples 1–20 in Table I.

TABLE III

| Ex. No. | Type sodium silicate | Wt. ratio SiO₂/Na₂O | Wt. percent treating agent | PFR |
|---|---|---|---|---|
| Control D | | | | 70 |
| 24 | S-35 | 3.75 | 2.5 | 2001 |
| 25 | K | 2.90 | 2.5 | 182 |
| 26 | N | 3.22 | 2.5 | 171 |
| 27 | RU | 2.40 | 2.5 | 168 |
| 28 | D | 2.0 | 2.25 | 139 |
| Control B | | | | 30 |
| 29 | Sodium metasilicate (Na₂SiO₃·9H₂O) | 1.0 | 2.5 | 48 |
| 30 | do | 1.0 | 5.0 | 51 |
| 31 | do | 1.0 | 10.0 | 58 |

It can be seen from the foregoing data, the treatment of perlite filteraids with sodium metasilicate results in very little improvement of the product insofar as flow rate is concerned. It is therefore essential that a SiO₂/Na₂O weight ratio of at least 1.5:1 be maintained in order to achieve the beneficial results described and claimed herein.

While the advantages of the products prepared in accordance with the novel process disclosed herein have been represented only in terms of water permeability flow ratios (PFR) it has also been found that the products have equally improved performance in the filtration of raw sugar solutions and other industrial liquids and it is known that the PFR values correlate well with the filtration characteristics of the large majority of industrial liquids encountered in commerce which require filtration.

It is to be understood that modifications of the procedures disclosed herein, particularly for applying the silicate solution to the perlite filteraid products, and other alkali metal silicates such as those of potassium or lithium, may be used without departing from the spirit of the invention. Also, the invention is not limited to the specific embodiments disclosed herein but only in accordance with the scope of the appended claims as read in the light of the foregoing specification.

What is claimed is:

1. A process for improving the flow ratio characteristics of perlite filteraids which comprises treating said filteraids uniformly with a solution of an alkali metal (M) silicate having an SiO₂/M₂O weight ratio between 1.5:1 to 4:1 in an amount between about 0.5 to 5% by weight of said filteraid, the amount of said solution being sufficient to uniformly wet the filteraid particles, and heating the resulting treated filteraid product at a temperature sufficiently high to remove substantially all of the solvent therefrom but below the fusion point of the treated filteraid product, in which said alkali metal is sodium, potassium or lithium.

2. A process according to claim 1 wherein the ratio of SiO₂/M₂O is between about 2 to 4:1.

3. A process according to claim 1 wherein the heating temperature is within the range of about 500° to 1000° F.

4. A process according to claim 1 wherein the alkali metal silicate is sodium silicate.

5. A process according to claim 4 wherein the ratio of SiO₂/Na₂O is between 2 to 4:1.

6. A process according to claim 4 wherein the ratio of SiO₂/Na₂O is between 2 to 4:1 and the treated filter aid product is heated within the range of about 500° to 1000° F.

References Cited

UNITED STATES PATENTS

| 2,701,240 | 2/1955 | Bregar | 210—502 X |
| 2,057,414 | 10/1936 | Briggs et al. | 210—506 X |
| 2,625,516 | 1/1953 | Metzger et al. | 117—100 X |
| 3,235,635 | 2/1966 | Riede | 210—500 X |
| 3,321,410 | 5/1967 | MacArthur et al. | 252—378 |
| 3,335,869 | 8/1967 | Hedges | 210—500 |

FOREIGN PATENTS 133,784  8/1949  Australia.

REUBEN FRIEDMAN, *Primary Examiner.*

W. S. BRADBURY, *Assistant Examiner.*

U.S. Cl. X.R.

210—502, 506